United States Patent Office 2,695,906 Patented Nov. 30, 1954

2,695,906

PREGNADIENES

John A. Hogg, Kalamazoo Township, Kalamazoo County, Philip F. Beal, Portage Township, Kalamazoo County, and Frank H. Lincoln, Jr., Kalamazoo Township, Kalamazoo County, Mich., assignors to The Upjohn Company, Kalamazoo, Mich., a corporation of Michigan No Drawing. Application March 30, 1953, Serial No. 345,678

10 Claims. (Cl. 260—397.45)

This invention relates to novel pregnadienes, more particularly to 11α,21-dihydroxy-4,17(20)-pregnadiene-3-ones and certain hydrocarbon carboxylic acid esters thereof, and to a process for the production thereof. This application is a continuation-in-part of our copending application Serial No. 307,385, filed August 30, 1952.

It is an object of the present invention to provide the novel 11α,21-dihydroxy-4,17(20)-pregnadiene-3-one and certain hydrocarbon carboxylic acid esters thereof. Another object is the provision of a novel process for the production of 11α,21-dihydroxy-4,17(20)-pregnadiene-3-one. Other objects will be apparent to those skilled in the art to which this invention pertains.

The novel 11α,21-dihydroxy-4,17(20)-pregnadiene-3-one of the present invention may be prepared by the following sequence of reactions which may be represented as follows:

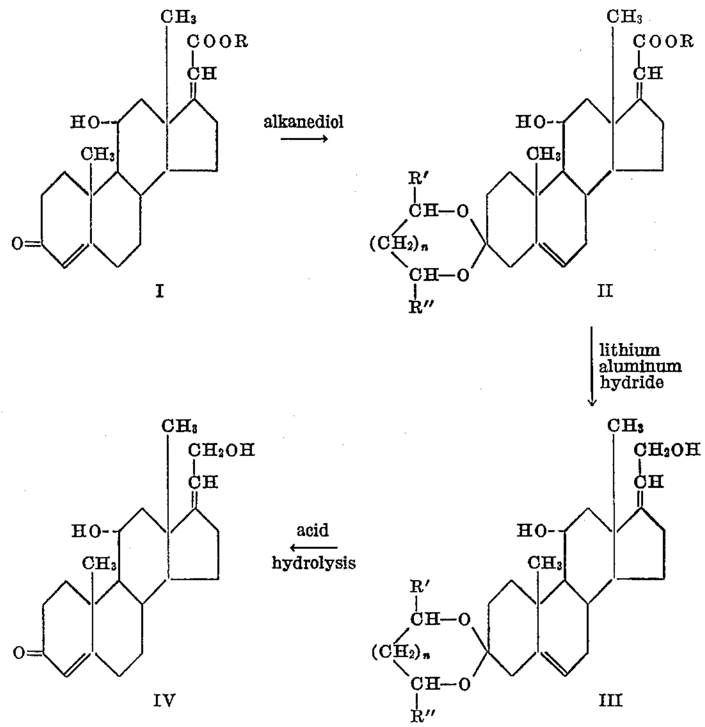

wherein R, R′ and R″ are hydrogen or alkyl radicals preferably containing from one to eight carbon atoms, inclusive. The novel 11α,21-dihydroxy-4,17(20)-pregnadiene-3-one of the present invention is represented by Formula IV. The novel 11α,21-dihydroxy-4,17(20)-pregnadiene-3-one and the novel esters thereof of the present invention may be represented by the following formula:

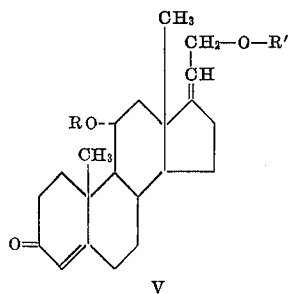

wherein R and R′ are hydrogens or acyl radicals of hydrocarbon carboxylic acids containing from one to eight carbon atoms, inclusive.

According to the method of the present invention, an 11α-hydroxy-21-carbonyloxy - 4,17(20) - pregnadiene-3-one (I) is contacted with an alkane-α-diol or an alkane-β-diol, i. e., a glycol, in the presence of an acid catalyst, to produce a 3-cyclic ketalized 11α-hydroxy-21-carbonyloxy-4,17(20)-pregnadiene-3-one (II). The reaction of said ketalized compound with lithium aluminum hydride in an organic solvent therefor followed by a mild aqueous hydrolysis of any excess lithium aluminum hydride or organo-lithium complexes is productive of a 3-cyclic ketalized 11α,21-dihydroxy-4,17(20)-pregnadiene-3-one (III) which may then be isolated for purification, identification or other purpose. Subjecting said latter compound to an aqueous acid hydrolysis is productive of the 11α,21-dihydroxy-4,17(20)-pregnadiene-3-one (IV) of the present invention, which can be converted, as can the acid esters thereof of the present invention, to cortisone or esters thereof according to methods described hereinafter and illustrated in greater detail in copending application Serial No. 307,385, filed August 30, 1952.

The compounds represented by Formula I may be named as 11α-hydroxy-21-carbonyloxy-4,17(20)-pregnadiene-3-ones or as 3-keto-11α-hydroxy-4,17(20)-pregnadiene-21-oic acid and alkyl esters thereof. Similarly, the compounds represented by Formula II may be named as 3-cyclic ketalized 11α-hydroxy-21-carbonyloxy-4,17(20)-pregnadiene-3-ones or as 3-cyclic ketalized 3-keto-11α-hydroxy-4,17(20)-pregnadiene-21-oic acid and alkyl esters thereof.

Reacting, according to methods known in the art, [Prins and Reichstein, Helv. Chim. Acta, 25, 300 (1942); Ruzicka and Mueller, Helv. Chim. Acta, 22, 755 (1939)], 11α,21-dihydroxy-4,17(20)-pregnadiene-3-one (V, R and R'=H), or an ester thereof of the present invention, e. g., a 21-hydrocarbon carboxylic acid ester thereof (V, R=H, R'=acyl), or an 11α,21-hydrocarbon carboxylic acid diester thereof (V, R and R'=acyl), of the present invention with osmium tetraoxide to produce 11α,17α,20,21-tetrahydroxy-4,17(20)-pregnadiene-3-one 17,20 - osmate ester, a 21-mono-acyloxy ester thereof, or an 11α,21-diacyloxy ester thereof, respectively, followed by oxidation with potassium chlorate, or other equivalent oxidizing agent, e. g., hydrogen peroxide, dialkyl peroxides, organic peracids, or the like, in a solvent such as an ether or an alcohol, e. g., tertiary butyl alcohol or diethyl ether, followed by heating with an aqueous sodium sulfite solution, is productive of 11α,17α,21-trihydroxy-4-pregnene-3,20-dione (Murray and Peterson, U. S. Patent 2,602,769, issued July 8, 1952), which can be converted to cortisone as described in the above-cited patent by acylation of the 21-hydroxy group followed by a chromic acid oxidation of the 11α-hydroxy group.

The starting 11α-hydroxy-21-carbonyl-4,17(20)-pregnadiene-3-ones (I) are prepared by contacting an 11α-hydroxy-21,21-dihalo-21-carbonylprogesterone represented by the following formula:

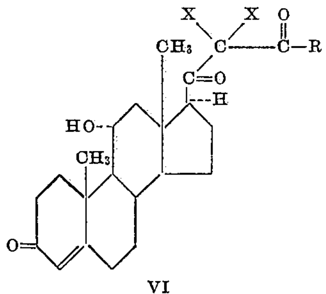

wherein X is a halogen having an atomic weight from 35 to 127, inclusive, i. e., chlorine, bromine or iodine, wherein R is hydrogen or a radical having the formula

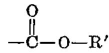

R' being a hydrocarbon radical, with a base, e. g., an alkali-metal alkoxide, in the presence of hydroxy or alkoxy ions to produce a starting 11α-hydroxy-21-carbonyloxy-4,17(20)-pregnadiene-3-one (I) according to the method illustrated in the preparations hereinafter and as more fully disclosed in the above-cited copending application.

In carrying out the first step of the process of the present invention, a starting steroid (I) described above, is contacted with an alkane-α-diol or an alkane-β-diol, in the presence of an acid catalyst, at a temperature from about room temperature to the boiling point of the reaction solvent employed, for from about one-half hour to about eighteen hours or longer, to produce a 3-cyclic ketalized 11α-hydroxy-21-carbonyloxy-pregnadiene-3-one (II). If the water of the reaction is concomitantly removed, the preferred reaction period is the time required to remove about a molar equivalent of water per mole of steroid from the reaction mixture. Under these conditions, when the starting steroid is a free acid, the acid group may, to a certain extent, be esterified by the alkanediol to produce a glycol ester thereof. Treatment of the reaction mixture with aqueous or alcoholic base, preferably an alkali-metal base, and then liberating the free acid from the thus-produced salt, taking care to avoid hydrolysis of the ketal radical, is productive of essentially pure product (II) wherein R is H, i. e., a free acid.

Alkane-α-diols and alkane-β-diols which may be used include ethylene glycol, trimethylene glycol, and alkyl-substituted ethylene glycols and trimethylene glycols, preferably having no more than two alkyl groups substituted thereon, e. g., propane-1,2-diol, butane-1,2-diol, 3-methylbutane-1,2-diol, octane-1,2-diol, butane-2,3-diol, pentane-2,3-diol, 5,5-dimethyloctane-2,3-diol, butane-1,3-diol, pentane-2,4-diol, 4-methylpentane-1,3-diol, octane-1,3-diol, and the like, producing ketalized compounds represented by Formula II wherein *n* is zero or one.

Acid catalysts which may suitably be employed in the reaction include anhydrous hydrogen chloride, concentrated sulfuric acid, para-toluenesulfonic acid, benzenesulfonic acid, sulfoacetic acid, and the like, in amounts from a trace to a substantial fraction of a molar equivalent per mole of steroid.

Reaction solvents which may be suitably employed include hydrocarbon solvents, halogenated hydrocarbons, ethers, esters, and the like, such as, for example, benzene, toluene, xylene, hexane, heptane, chloroform, carbon tetrachloride, chlorobenzene, diethyl ether, dioxane, tetrahydrofuran, and others, or an excess of the alkanediol employed.

A suitable method of carrying out the above-described step of the process of the present invention comprises dissolving the starting steroid and the selected glycol, preferably ethylene glycol, in the selected solvent, preferably a water-immiscible solvent, e. g., benzene, toluene, or carbon tetrachloride, and thereafter heating the reaction mixture, in the presence of a reaction catalyst, at the reflux temperature thereof, with the concomitant removal of the water formed in the reaction, until about a molar equivalent of water per mole of steroid has been removed from the mixture. Reaction times from about one-half hour to several days may sometimes be required to complete the ketalization to a satisfactory extent.

Isolation of the resulting ketalized steroid (II) is conveniently achieved by washing the reaction mixture with dilute base, e. g., dilute aqueous sodium bicarbonate, sodium carbonate, potassium hydroxide, methanolic sodium hydroxide, sodium methoxide or the like, and then distilling the mixture to dryness. When the reaction solvent is substantially water-soluble, the base wash may be performed after the solvent has been removed, or the distillation may be omitted in favor of precipitation of the steroid from the mixture by the addition of a large volume of water, preferably containing enough base to neutralize the catalyst.

The next step of the process of the present invention comprises treating a 3-cyclic ketalized 3-keto-11α-hydroxy-4,17(20)-pregnadiene-21-oic acid or ester thereof (II), with a reducing agent such as lithium aluminum hydride or the like, to produce a 3-cyclic ketalized 11α,21-dihydroxy-4,17(20)-pregnadiene-3-one (III).

The lithium aluminum hydride reduction is usually carried out by adding a solution of the selected 3-cyclic ketalized 11α-hydroxy-4,17(20)-pregnadiene-21-oic acid or alkyl ester thereof in an organic solvent which is non-reactive under the conditions of the reaction to a solution or suspension of lithium aluminum hydride in ether. Other solvents which may be used include dioxane, tetrahydrofuran, or the like, as well as other solvents commonly used in lithium aluminum hydride reductions. When ether is used, the reaction is usually carried out at a temperature between about room temperature and the boiling point of the ether, although temperatures substantially below room temperature can be successfully employed, e. g., from about minus ten to about plus ten degrees centigrade, such temperatures sometimes resulting in a higher yield of desired product.

Lithium aluminum hydride is usually employed in a substantial chemical equivalent excess to ensure optimum yields of desired product. When the steroid and lithium aluminum hydride have been thoroughly mixed and the heat of reaction has subsided, the reaction is essentially complete. Continued stirring or heating or both are usually employed, however, to ensure completeness of reaction. The excess lithium aluminum hydride and any organo-lithium complex present may be decomposed by the careful addition of water to the reaction mixture. If the reaction mixture is maintained at an alkaline pH, that is, if no acid is added during the decomposition of the lithium aluminum hydride or subsequent thereto, or if an organic acid such as, for exxample, acetic acid, propionic acid, or the like, is employed in the hydrolysis, the corresponding 3-cyclic ketalized 11,21-dihydroxy-4,17(20)-pregnadiene-3-one can be isolated directly from the reaction mixture. This is frequently advantageous since the 3-cyclic ketalized steroid is sometimes more readily purified than the hydrolyzed free ketone. Separating the organic phase from the aqueous phase of the decomposed reaction mixture and then distilling the solvent therefrom leaves a distillation residue consisting essentially of the desired product. The resulting 3-cyclic ketalized 11α,21-dihydroxy-4,17(20)-pregnadiene-3-one (III) may be isolated as described above, for example, or further reacted without isolation as more fully disclosed hereinafter.

The free 3-ketone, 11α,21-dihydroxy-4,17(20)-pregnadiene-3-one (IV), is prepared by treatment of a solution of the crude or purified 3-cyclic ketalized 11α,21-dihydroxy-4,17(20)-pregnadiene-3-one in an organic solvent with dilute aqueous acid, preferably a mineral acid such as, for example, hydrochloric or sulfuric acid, usually at about room temperature, for from about one-half hour to about 72 hours. The amount of the acid employed is usually from about a trace to a large molar excess and concentrations from extremely dilute to fairly concentrated may be employed since the acid acts only as a catalyst for the hydrolysis. The hydrolysis of the 3-cyclic ketal can be carried out under fairly rigorous conditions, i. e., with fairly strong concentration of acid and at temperatures substantially above room temperature, since the 11α-hydroxy group does not readily dehydrate in the presence of acid. The reaction temperature and reaction time required to complete the hydrolysis reaction are somewhat dependent upon the particular 3-ketal group present in the steroid. Isolation of the free 11α,21-dihydroxy-4,17(20)-pregnadiene-3-one is conveniently achieved by neutralizing the reaction mixture, distilling the solvent therefrom, or adding a large volume of water thereto if the solvent is water-miscible, and then removing the thus-precipitated product. The thus-isolated 11α,21-dihydroxy-4,17(20)-pregnadiene-3-one (IV), after drying, usually does not require purification for subsequent reactions if the starting 3-cyclic ketal was pure.

A convenient procedure for obtaining an 11α,21-dihydroxy-4,17(20)-pregnadiene-3-one (IV) from 3-keto-11α-hydroxy-4,17(20)-pregnadiene-21-oic acid or alkyl ester thereto (I) involves reacting the starting 3-keto-11α-hydroxy-4,17(20)-pregnadiene-21-oic acid or alkyl ester thereof, protected at the 3 position with a 3-ketal, preferably a 3-ethylene glycol ketal (II, R′ and R″=H, $n$=1), with a reducing agent, e. g., lithium aluminum hydride, according to the procedure described above and then, after decomposing the excess lithium aluminum hydride with water, hydrolyzing the 3-ketal of the reaction product without isolation. This is conveniently accomplished by adding a mineral acid, preferably hydrochloric acid, to the reaction mixture to render the mixture slightly acidic, and thereafter stirring the acidic reaction mixture for from about one-half hour to about 72 hours to remove the protecting group at the 3 position. Isolation of the thus-produced 11α,21-dihydroxy-4,17(20)-pregnadiene-3-one is conveniently achieved by removing the organic layer from the reaction mixture, washing said layer with water or base, and then distilling the solvent therefrom to leave as distillation residue the essentially pure 11α,21-dihydroxy-4,17(20)-pregnadiene-3-one (IV).

The novel esters of the present invention, i. e., compounds represented by Formula V wherein R and/or R′ are acyl radicals of hydrocarbon carboxylic acids containing from one to eight carbon atoms, inclusive, are prepared by reacting 11α,21-dihydroxy-4,17(20)-pregnadiene-3-one with formic or acetic acid in the presence of an esterification catalyst, with the acid chloride or anhydride of propionic, dimethylacetic, trimethylacetic, butyric, valeric, hexanoic, β-cyclopentylpropionic, cyclopentylformic, cyclohexylformic, benzoic, 2,6-dimethylbenzoic, heptanoic, octanoic, or like acid, in the presence of pyridine, glacial acetic acid, or the like, or by other suitable esterification procedures. If the 21-mono ester is the primarily desired ester, the molar ratio of acylating agent to steroid is preferably about one to one or less. When the 11α,21-diester is the desired product, use of greater than one molar equivalent, and preferably two or more molar equivalents, of acylating agent per mole of steroid is the preferred procedure. Treatment of 11α-hydroxy-21-formyloxy-4,17(20)-pregnadiene-3-one, for example, with trimethylacetylchloride in pyridine to produce 11α-trimethylacetoxy-21-formyloxy-4,17(20)-pregnadiene-3-one followed by gentle acid hydrolysis of the thus-produced mixed acid diester is productive of 11α-trimethylacetoxy-21-hydroxy-4,17(20)-pregnadiene-3-one. Other mono and diesters of 11α,21-dihydroxy-4,17(20)-pregnadiene-3-one are prepared in a similar manner.

Isolation and purification of the thus-produced esters may be carried out in a conventional manner by fractional crystallization, chromatographic separation, or like means.

The process of the present invention provides a method of converting a steroid having a $\Delta^4$-3-keto group and a 21-carbonyloxy group into a steroid in which the $\Delta^4$-3-keto group remains but the 21-carbonyloxy group has been converted into a 21-hydroxy group. Heretofore, the methods known in the art would have reduced the keto group to a hydroxy group and left the carbonyloxy group unchanged, or would have reduced both the keto group and the carbonyloxy group, or would have also reduced the $\Delta^4$ double bond.

The following examples are illustrative of the process and products of the present invention but are not to be construed as limiting.

PREPARATION 1.—SODIUM ENOLATE OF 11α-HYDROXY-21-ETHOXYOXALYLPROGESTERONE

Three and three-tenths (3.3) grams of 11α-hydroxyprogesterone, [Peterson and Murray, J. Am. Chem. Soc., 74, 1871 (1952)], was dissolved in a solution of 0.25 gram of sodium in eight milliliters of absolute ethanol, and 1.46 grams of ethyl oxalate was added thereto. The resulting solution was allowed to stand for six hours at room temperature, during which time the color of the solution changed from yellow to brown. The sodium enolate of 11α-hydroxy-21-ethoxyoxalylprogesterone thus produced was isolated by the addition of a large volume of ether as a yellow amorphous solid which decomposed above 200 degrees centigrade.

PREPARATION 2.—11α-HYDROXY-21,21-DIBROMO-21-ETHOXYOXALYLPROGESTERONE

To a stirred solution of 4.52 grams (0.01 mole) of the sodium enolate of 11α-hydroxy-21-ethoxyoxalylprogesterone in 150 milliliters of methanol was added dropwise one milliliter (0.02 mole) of bromine. The thus-produced 11α-hydroxy-21,21-dibromo-21-ethoxyoxalylprogesterone is isolated by pouring the reaction mixture into a large volume of water and separating the precipitated product.

PREPARATION 3.—3-KETO-11α-HYDROXY-4,17(20)-PREGNADIENE-21-OIC ACID METHYL ESTER

To a solution of 29.4 grams (0.05 mole) of 11α-hydroxy-21,21-dibromo-21-ethoxyoxalylprogesterone in 550 milliliters of methanol was added a solution of 16.5 grams (0.3 mole) of sodium methoxide in 500 milliliters of methanol. The reaction mixture was maintained at about 25 degrees centigrade for sixteen hours whereafter an equal volume of water was added thereto, and the whole was extracted with about equal portions of first benzene and then two portions of methylene chloride. The combined extracts were dried with anhydrous sodium sulfate and thereafter distilled to remove the solvent therefrom. The distillation residue was dissolved in 500 milliliters of methylene chloride and chromatographed over 875 grams of Florisil synthetic magnesium silicate. The column was developed with 1,250-milliliter portions of solvents of the following composition and order: four of methylene chloride plus five percent acetone, four of methylene chloride plus ten percent acetone, four of methylene chloride plus fifteen percent acetone, two of methylene chloride plus twenty percent acetone, and finally, two of acetone. The methylene chloride plus ten percent acetone eluates and the first methylene chloride plus fifteen percent acetone eluate were combined and the solvent distilled therefrom. The seven grams of distillation residue was recrystallized from a mixture of ethyl acetate and Skellysolve B hexane hydrocarbons to yield crystalline 3-keto-11α-hydroxy-4,17(20)-pregnadiene-21-oic acid methyl ester, melting at 205 to 210 degrees centigrade.

Analysis:

Calculated for $C_{22}H_{30}O_4$:
C, 73.75; H, 8.48

Found:
C, 73.77; H. 8.38
C, 74.10; H, 8.59

Similarly, other 3-keto-11α-hydroxy-4,17(20)-pregnadiene-21-oic acid esters are prepared wherein the ester is methyl, propyl, butyl, amyl, hexyl, heptyl, octyl, or the like, by replacing the sodium methoxide in methanol used in the above-described reaction by the selected alkali-metal alkoxide in an alkanol.

PREPARATION 4.—3-KETO-11α-HYDROXY-4,17(20)-PREGNADIENE-21-OIC ACID

In exactly the same manner as given in Preparation 3, 3-keto-11α-hydroxy-4,17(20)-pregnadiene-21-oic acid is prepared from 11α-hydroxy-21,21-dibromo-21-ethoxyoxalylprogesterone by substituting 3.4 grams (0.6 mole) of potassium hydroxide for the sodium methoxide in the above-described reaction. 3-keto-11α-hydroxy-4,17(20)-pregnadiene-21-oic acid is isolated from the reaction mixture by adding water thereto, washing with methylene chloride, and then acidifying the washed reaction mixture. The precipitated 3-keto-11α-hydroxy-4,17(20)-pregnadiene-21-oic acid is purified by separating the precipitated product and crystallizing the dried product from a solvent such as, for example, acetone plus Skellysolve B hexane hydrocarbons.

*Example 1.—3-ethylene glycol ketal of 3-keto-11α-hydroxy-4,17(20)-pregnadiene-21-oic acid methyl ester*

To a solution of 1.5 grams (0.0042 mole) of 3-keto-11α-hydroxy-4,17(20)-pregnadiene-21-oic acid methyl ester in 150 milliliters of benzene were added 7.5 milliliters of ethylene glycol and 0.150 gram of para-toluenesulfonic acid and the whole was then refluxed and stirred for 5.5 hours. The cooled solution was then washed with 100 milliliters of a one percent aqueous sodium bicarbonate solution whereafter the washed solution was poured over a column of 200 grams of Florisil magnesium silicate. The column was developed with 200-milliliter portions of solvents of the following composition and order: four of Skellysolve B hexane hydrocarbons plus four percent acetone, four of Skellysolve B plus six percent acetone, four of Skellysolve B plus ten percent acetone, four of Skellysolve B plus fifteen percent acetone, and finally, two portions of acetone. The last Skellysolve B plus ten percent acetone eluate and the first three Skellysolve B plus fifteen percent acetone eluate fractions were combined, the solvent removed therefrom, and the residual 3-ethylene glycol ketal of 3-keto-11α-hydroxy-4,17(20)-pregnadiene-21-oic acid methyl ester was recrystallized from a mixture of ethyl acetate and Skellysolve B hexane hydrocarbons to give 1.46 grams of crystals melting at 181 to 185 degrees centigrade. Further recrystallization of these crystals gave 1.25 grams of the 3-ethylene glycol ketal of 3-keto-11α-hydroxy-4,17(20)-pregnadiene-21-oic acid methyl ester melting at 184 to 188 degrees centigrade.

Analysis:
Calculated for $C_{24}H_{34}O_5$:
C, 71.65; H, 8.52
Found:
C, 71.69; H, 8.40
C, 71.86; H, 8.40

*Example 2.—3-ethylene glycol ketal of 3-keto-11-α-hydroxy-4,17(20)-pregnadiene-21-oic acid ethyl ester*

Following the procedure described in Example 1, the reaction of 3-keto-11α-hydroxy-4,17(20)-pregnadiene-21-oic acid ethyl ester with more than about one molar equivalent of ethylene gloycol, in the presence of para-toluenesulfonic acid, is productive of the 3-ethylene glycol ketal of 3-keto-11α-hydroxy-4,17(20)-pregnadiene-21-oic acid ethyl ester.

Similarly, the 3-ethylene glycol ketal of other esters of 3-keto-11α-hydroxy-4,17(20)-pregnadiene-21-oic acid such as, for example, the propyl, butyl, amyl, hexyl, heptyl, octyl, or like ester, is prepared by reacting the selected alkyl ester of 3-keto-11α-hydroxy-4,17(20)-pregnadiene-21-oic acid with ethylene glycol according to the method described in Example 1, in the presence of an acid catalyst such as, for example, hydrogen chloride, benzenesulfonic acid, para-toluenesulfonic acid, or the like.

*Example 3.—3-ethylene glycol ketal of 3-keto-11α-hydroxy-4,17(20)-pregnadiene-21-oic acid methyl ester*

A mixture of 7.5 grams (0.0215 mole) of 3-keto-11α-hydroxy-4,17(20)-pregnadiene-21-oic acid methyl ester, 37.5 milliliters of ethylene glycol, and 0.75 gram of para-toluenesulfonic acid in 750 milliliters of dry benzene was refluxed with concomitant removal of the water of reaction for 5.5 hours. The cooled mixture was then stirred for five minutes with 500 milliliters of a one percent aqueous sodium bicarbonate solution whereafter the benzene layer was removed, dried over anhydrous sodium sulfate and the solvent then removed from the dried solution by distillation at reduced pressure. The residual solids were dissolved in fifty milliliters of hot ethyl acetate to which was then added 400 milliliters of hot Skellysolve B hexane hydrocarbons. The mixture, after cooling to room temperature, was chilled in a refrigerator at four degrees centigrade for four hours. The precipitated solids were filtered and dried in vacuo to yield 5.8 grams of the 3-ethylene glycol ketal of 3-keto-11α-hydroxy-4,17(20)-pregnadiene-21-oic acid methyl ester melting at 175 to 182 degrees centigrade. Recrystallization of this material from ethyl acetate and Skellysolve B raised the melting point to 183 to 186 degrees centigrade. The rotation of the product $[\alpha]_D^{23}$ was plus 23 degrees in acetone.

*Example 4.—3-trimethylene glycol ketal of 3-keto-11α-hydroxy-4,17(20)-pregnadiene-21-oic acid methyl ester*

In the same manner as described in Example 1, reacting 3-keto-11α-hydroxy-4,17(20)-pregnadiene-21-oic acid methyl ester with trimethylene glycol in the presence of para-toluenesulfonic acid is productive of the 3-trimethylene glycol ketal of 3-keto-11α-hydroxy-4,17(20)-pregnadiene-21-oic acid methyl ester.

Similarly, other 3-ketals of the ethyl and other esters of 3-keto-11α-hydroxy-4,17(20)-pregnadiene-21-oic acid are produced by reaction of a selected ester of one of the steroid acids described in Examples 1 to 4, especially the methyl, ethyl, propyl, isopropyl, butyl, amyl, hexyl, heptyl, or octyl ester, with a glycol such as, for example, ethylene glycol, propylene glycol, trimethylene glycol, an alkyl substituted ethylene glycol, propylene glycol, or trimethylene glycol, or the like, in the presence of an acid catalyst such as, for example, para-toluenesulfonic acid, hydrogen chloride, sulfuric acid, or the like.

*Example 5.—3-ethylene glycol ketal of 3-keto-11α hydroxy-4,17(20)-pregnadiene-21-oic acid*

The 3-ethylene glycol ketal of 3-keto-11α-hydroxy-4,17(20)-pregnadiene-21-oic acid is prepared by allowing a mixture of 3-keto-11α-hydroxy-4,17(20)-pregnadiene-21-oic acid and a large molar excess of ethylene glycol, to which has been added a small amount of para-toluenesulfonic acid, to stand at room temperature for 48 hours. The excess ethylene glycol is then distilled at reduced pressure and the distillation residue washed with dilute sodium hydroxide. The aqueous layer is then separated and acidified thereby precipitating 3-ethylene glycol ketal of 3-keto-11α-hydroxy-4,17(20)-pregnadiene-21-oic acid along with small amounts of starting material which is separated therefrom by repeated crystallization of the mixture. The material not extracted with the dilute base contains some steroid whose acid radical is esterified by the ethylene glycol. Treating this material with dilute sodium hydroxide in methanol and water followed by liberation of the free acid by neutralization of the mixture with very dilute acid is productive of the 3-ethylene glycol ketal of 3-keto-11α-hydroxy-4,17(20)-pregnadiene-21-oic acid which may be purified in the same manner as the precipitated reaction product described above.

Similarly, other 3-glycol ketals of 3-keto-11α-hydroxy-4,17(20)-pregnadiene-21-oic acid are prepared by substituting the selected 3-glycol ketal of 3-keto-11α-hydroxy-4,17(20)-pregnadiene-21-oic acid for the 3-ethylene glycol ketal thereof in the above-described reaction.

*Example 6.—3-ethylene glycol ketal of 11α,21-dihydroxy-4,17(20)-pregnadiene-3-one*

A solution of 4.025 grams (0.011 mole) of the 3-ethylene glycol ketal of 3-keto-11α-hydroxy-4,17(20)-pregnadiene-21-oic acid methyl ester dissolved in 100 milliliters of benzene was added slowly to a solution of 0.48 gram of lithium aluminum hydride in 100 milliliters of anhydrous ether whereafter the whole was refluxed for one hour. The excess lithium aluminum hydride was decomposed by adding water to the cooled reaction mixture which was thereafter mixed with diatomaceous earth filter aid and then filtered. The solvent layer was separated and filter cake and aqueous layer washed with two 25-milliliter portions of benzene which was then added to the solvent layer. The combined solvent was dried over anhydrous sodium sulfate and the dried solution distilled at reduced pressure leaving four grams of solids which were crystallized from ethyl acetate plus Skellysolve B to yield 2.86 grams of the 3-ethylene glycol ketal of 11α,21-dihydroxy-4,17(20)-pregnadiene-3-one melting at 205 to 208 degrees centigrade.

*Analysis.*—Calculated for $C_{23}H_{34}O_4$: C, 73.75; H, 9.15. Found: C, 73.10; H, 9.22.

*Example 7.—3-ethylene glycol ketal of 11α,21-dihydroxy-4,17(20)-pregnadiene-3-one*

To a stirred solution of 0.25 gram of lithium aluminum hydride in fifty milliliters of absolute ether was added dropwise a solution of 0.4025 gram (0.001 mole) of the 3-ethylene glycol ketal of 3-keto-11α-hydroxy-4,17(20)-pregnadiene-21-oic acid methyl ester in 75 milliliters of absolute ether. The reaction mixture was refluxed for one-half hour after the addition was complete, whereafter the mixture was allowed to cool to room temperature. After maintaining the reaction mixture at room temperature for an additional hour, the excess lithium aluminum hydride and complexes thereof were decomposed by the dropwise addition of 100 milliliters of water to the reaction mixture. The ether layer was separated, dried with anhydrous sodium sulfate, and the solvent removed from the dried solution by distillation to yield as the residue essentially pure 3-ethylene glycol ketal of 11α,21-dihydroxy-4,17(20)-pregnadiene-3-one.

*Example 8.—3-trimethylene glycol ketal of 11α,21-dihydroxy-4,17(20)-pregnadiene-3-one*

In the same manner as described in Example 7, the 3-trimethylene glycol ketal of 11α,21-dihydroxy-4,17(20)-pregnadiene-3-one is prepared by reacting the 3-trimethylene glycol ketal of an alkyl ester of 3-keto-11α-hydroxy-4,17(20)-pregnadiene-21-oic acid, prepared as described in Examples 1 and 4, with lithium aluminum hydride in ether.

Similarly, other 3-ketals of 11α,21-dihydroxy-4,17(20)-pregnadiene-3-one are prepared by reacting a selected 3 - keto - 11α - hydroxy - 4,17(20) - pregnadiene - 21-oic acid alkyl ester 3-ketal, such as those compounds described in Examples 1 to 4, or the like, with lithium aluminum hydride in ether, dioxane, tetrahydrofuran, or other suitable solvent.

*Example 9.—11α,21-dihydroxy - 4,17(20) - pregnadiene-3-one*

Repeating the reaction exactly as described in Example 7, but substituting 100 milliliters of dilute hydrochloric acid for the water used therein to decompose the lithium aluminum hydride, 11α,21-dihydroxy-4,17(20)-pregnadiene-3-one is isolated from the reaction. Distillation of the dried ether layer in the same manner as described in Example 7 yields the theoretical 0.330 gram of 11α,21-dihydroxy-4,17(20)-pregnadiene-3-one.

In the same manner as described in Example 9, 11α,21-dihydroxy-4,17(20)-pregnadiene-3-one is prepared by contacting other 3-ketals of 11α,21-dihydroxy-4,17(20)-pregnadiene-3-one, especially the 3-ketals described in Examples 6, 7 and 8, with a hydrolyzing agent such as, for example, dilute hydrochloric acid, sulfuric acid, or the like.

*Example 10.—11α,21-dihydroxy-4,17(20) - pregnadiene-3-one*

To a solution of 2.4 grams (0.0642 mole) of the 3-ethylene glycol ketal of 11α,21-dihydroxy-4,17(20)-pregnadiene-3-one in 160 milliliters of acetone was added four drops of concentrated sulfuric acid in forty milliliters of water and the mixture was then refluxed for two hours. The cooled solution was rendered neutral by the addition of a dilute aqueous solution of sodium bicarbonate and the acetone was then removed therefrom by distillation at reduced pressure. The precipitated product was extracted with methylene chloride which was subsequently dried over anhydrous sodium sulfate after separation from the aqueous layer. The dried methylene chloride solution was distilled to dryness at reduced pressure to leave 1.96 grams, a yield of 93 percent of the theoretical, of product consisting essentially of 11α,21-dihydroxy-4,17(20)-pregnadiene-3-one.

*Example 11.—11α-hydroxy-21-acetoxy - 4,17(20) - pregnadiene-3-one*

11α-hydroxy-21-acetoxy-4,17(20)-pregnadiene -3-one is prepared by dissolving 90.5 milligrams of 11α,21-dihydroxy-4,17(20)-pregnadiene-3-one in two milliliters of dry benzene, to which is then added 0.03 milliliter of redistilled acetic anhydride in one milliliter of pyridine. The whole is maintained at room temperature for sixteen hours and then diluted with fifty milliliters of water. The aqueous layer is extracted with five 25-milliliter portions of ether which is then added to the previously separated ether layer of the diluted reaction mixture. The combined ether extracts are then washed with dilute hydrochloric acid until no pyridine remains in the ether layer and then twice with a two percent aqueous sodium bicarbonate solution and finally with water. The ether extracts are then dried with anhydrous sodium sulfate and the solvent then removed from the dried solution leaving as the distillation residue 11α-hydroxy-21-acetoxy-4,17(20)-pregnadiene-3-one. This residue is then dissolved in ten milliliters of benzene which is then poured over five grams of Florisil synthetic magnesium silicate and the column developed with Skellysolve B hexane hydrocarbons containing increasing percentages of acetone. The fraction containing the largest fraction of the total solids contains substantially pure 11α-hydroxy-21-acetoxy-4,17(20)-pregnadiene-3-one.

Similarly, substituting a molar equivalent amount of formic acid in glacial acetic acid, the acid chloride of propionic, butyric, dimethylacetic, trimethylacetic, valeric, phenylacetic, benzoic, 2,6-dimethylbenzoic, cyclopentylformic, cyclohexylformic, heptanoic, octanoic, or like acid, in pyridine or the like, is productive of other 11α-hydroxy-21-acyloxy-4,17(20)-pregnadiene-3-ones wherein the acyl group is the acyl group of the selected acylating agent.

*Example 12.—11α,21-diacetoxy-4,17(20) - pregnadiene-3-one*

Following the procedure described in Example 11, but using 0.3 milliliter of acetic anhydride and heating the mixture at fifty degrees centigrade for eight hours, is productive, after chromatographing over Florisil as described in Example 11, of essentially pure 11α,21-diacetoxy-4,17(20)-pregnadiene-3-one.

Similarly, substituting an equivalent or greater molar amount of formic acid in glacial acetic acid, or any one of the other acid chlorides of the acids described in Example 11, is productive of other 11α,21-diacyloxy-4,17(20)-pregnadiene-3-ones wherein the acyl groups are the acyl groups of the selected acylating agent.

*Example 13.—11α-trimethylacetoxy-21-hydroxy-4,17(20)-pregnadiene-3-one*

Reacting, according to the method described in Example 11, 11α-hydroxy-21-formyloxy-4,17(20)-pregnadiene-3-one with a molar equivalent excess of trimethylacetyl chloride in pyridine is productive of 11α-trimethylacetoxy-21-formyloxy-4,17(20)-pregnadiene-3 - one which, upon reaction in methanol with water in the presence of a catalystic amount of hydrochloric acid for a few hours at room temperature, is productive of 11α-trimethylacetoxy-21-hydroxy-4,17(20)-pregnadiene-3-one.

Similarly, other 11α-acyloxy-21-hydroxy-4,17(20)-pregnadiene-3-ones, wherein the acyloxy group corresponds to the acyloxy group of the starting 11α,21-diacyloxy-4,17(20)-pregnadiene-3-one, are prepared by reacting an 11α,21-diacyloxy-4,17(20)-pregnadiene-3-one wherein the acyloxy group at the 21 position is more readily hydrolyzable than the acyloxy group at the 11 position with an acid or base hydrolyzing agent under relatively mild conditions.

It is to be understood that this invention is not to be limited to the exact details of operation or exact compounds shown and described, as obvious modifications and equivalents will be apparent to one skilled in the art and the invention is therefore to be limited only by the scope of the appended claims.

We claim:

1. A process for the production of 11α,21-dihydroxy- 4,17(20)-pregnadiene-3-one which comprises the steps of: first, contacting an 11α-hydroxy-21-carbonyloxy-4,17(20)-pregnadiene-3-one represented by the following formula:

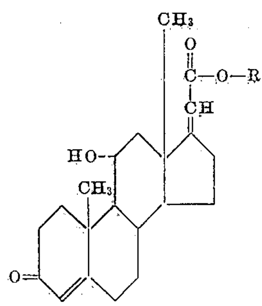

wherein R is selected from the group consisting of hydrogen and alkyl radicals, with an organic ketal forming agent selected from the group consisting of alkane-α-diols and alkane-β-diols, in the presence of an acid catalyst, to produce a 3-cyclic ketalized 3-keto-11α-hydroxy-4,17(20)-pregnadiene-21-carbonyloxy steroid, and then reacting the thus-produced 3-cyclic ketalized steroid with lithium aluminum hydride in the presence of an organic solvent, followed by the hydrolysis of any organo-lithium complexes and excess lithium aluminum hydride present and the acid hydrolysis of the thus-produced 3-cyclic ketalized 11α,21-dihydroxy-4,17(20)-pregnadiene-3-one to produce 11α,21-dihydroxy-4,17(20)-pregnadiene-3-one.

2. A process for the production of 11α,21-dihydroxy-4,17(20)-pregnadiene-3-one which comprises the steps of: first, contacting a 3-keto-11α-hydroxy-4,17(20)-pregnadiene-21-oic acid alkyl ester with an alkane-α-diol organic ketal forming agent, in the presence of an acid catalyst, to produce a 3-cyclic ketalized 3-keto-11α-hydroxy-4,17(20)-pregnadiene-21-oic acid alkyl ester and then reacting the thus-produced 3-cyclic ketalized steroid with lithium aluminum hydride in the presence of an organic solvent, followed by the hydrolysis of any organo-lithium complexes and excess lithium aluminum hydride present and the acid hydrolysis of the thus-produced 3-cyclic ketalized 11α,21dihydroxy-4,17(20)-pregnadiene-3-one to produce 11α,21-dihydroxy-4,17(20)-pregnadiene-3-one.

3. A process for the production of 11α,21-dihydroxy-4,17(20)-pregnadiene-3-one which comprises the steps of: first, contacting a 3-keto-11α-hydroxy-4,17(20)-pregnadiene-21-oic acid alkyl ester with ethylene glycol, in the presence of an acid catalyst, to produce a 3-ethylene glycol ketal of 3-keto-11α-hydroxy-4,17(20)-pregnadiene-21-oic acid alkyl ester and then reacting the thus-produced 3-cyclic ketalized steroid with lithium aluminum hydride in the presence of an organic solvent, followed by the hydrolysis of any organo-lithium complexes and excess lithium aluminum hydride present and the acid hydrolysis of the thus-produced 3-ethylene glycol ketal of 11α,21-dihydroxy-4,17(20)-pregnadiene-3-one to produce 11α,21-dihydroxy-4,17(20)-pregnadiene-3-one.

4. A process for the production of 11α,21-dihydroxy-4,17(20)-pregnadiene-3-one which comprises the steps of: first, contacting a 3,11-diketo-4,17(20)-pregnadiene-21-oic acid methyl ester with ethylene glycol, in the presence of an acid catalyst, to produce the 3-ethylene glycol ketal of 3-keto-11α-hydroxy-4,17(20)-pregnadiene-21-oic acid methyl ester and then reacting the thus-produced 3-ethylene glycol ketal of 3-keto-11α-hydroxy-4,17(20)-pregnadiene-21-oic acid methyl ester with lithium aluminum hydride in the presence of an organic solvent, followed by the hydrolysis of any organo-lithium complexes and excess lithium aluminum hydride present and the acid hydrolysis of the thus-produced 3-ethylene glycol ketal of 11α,21-dihydroxy-4,17(20)-pregnadiene-3-one to produce 11α,21-dihydroxy-4,17(20)-pregnadiene-3-one.

5. A process for the production of 11α,21-dihydroxy-4,17(20)-pregnadiene-3-one which comprises the steps of: first, contacting 3-keto-11α-hydroxy-4,17(20)-pregnadiene-21-oic acid methyl ester with ethylene glycol in the presence of an acid catalyst, to produce the 3-ethylene glycol ketal of 3-keto-11α-hydroxy-4,17(20)-pregnadiene-21-oic acid methyl ester and then reacting the thus-produced 3-ethylene glycol ketal of 3-keto-11α-hydroxy-4,17(20)-pregnadiene-21-oic acid methyl ester with lithium aluminum hydride in the presence of an organic solvent, followed by the hydrolysis of any organo-lithium complexes and excess lithium aluminum hydride present and the hydrolysis with aqueous hydrochloric acid of the thus-produced 3-ethylene glycol ketal of 11α,21-dihydroxy-4,17(20)-pregnadiene-3-one to produce 11α,21-dihydroxy-4,17(20)-pregnadiene-3-one.

6. A compound represented by the following formula:

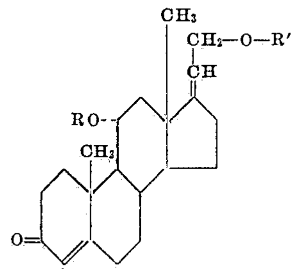

wherein R and R' are selected from the group consisting of hydrogen atoms and acyl radicals of hydrocarbon carboxylic acids containing from one to eight carbon atoms, inclusive.

7. A compound represented by the following formula:

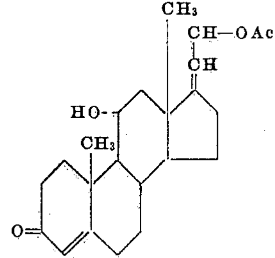

wherein Ac is the acyl radical of a hydrocarbon lower-aliphatic carboxylic acid.

8. 11α,21-diacetoxy-4,17(20)-pregnadiene-3-one.

9. 11α-hydroxy - 21 - acetoxy-4,17(20)-pregnadiene-3-one.

10. $\Delta^{4,17(20)}$-pregnadiene-11α,21-diol-3-one of the following formula:

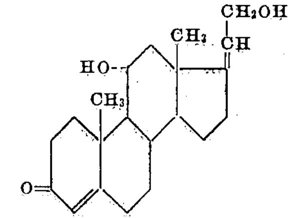

No references cited.